June 23, 1931.  E. A. JOHNSTON  1,811,052
UNIT POWER PLANT SUPPORT FOR MOTOR VEHICLES
Filed Nov. 24, 1928
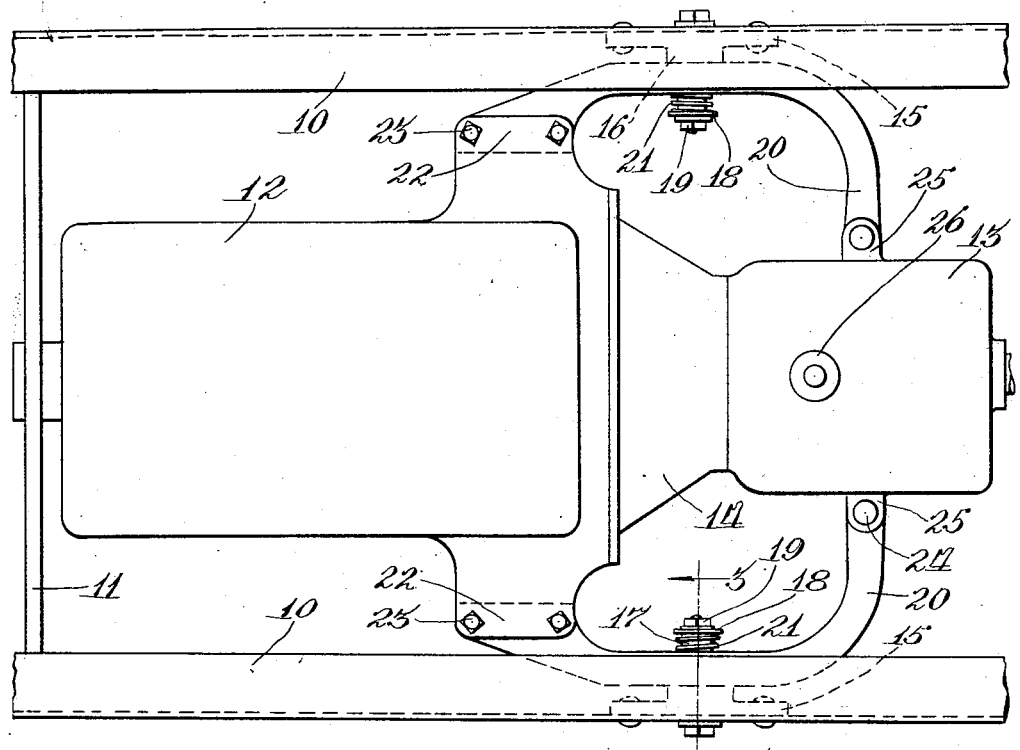
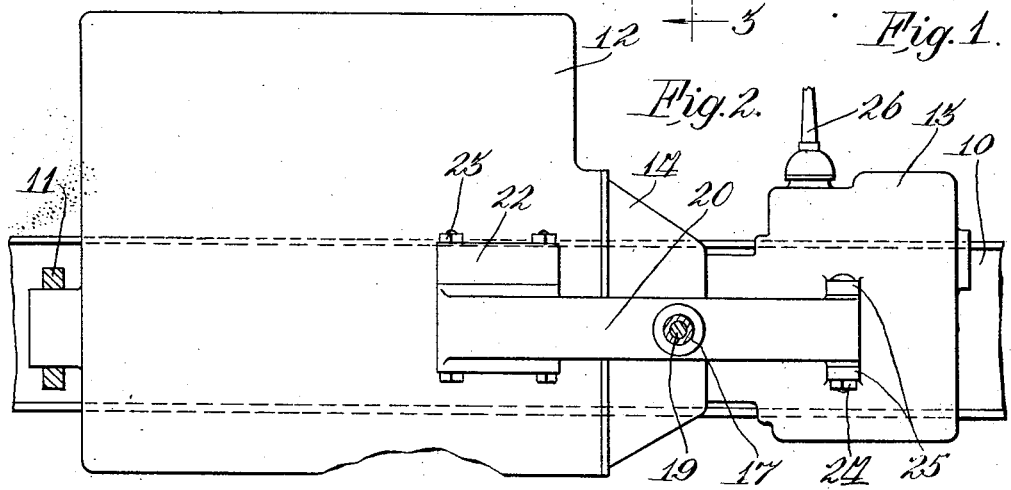
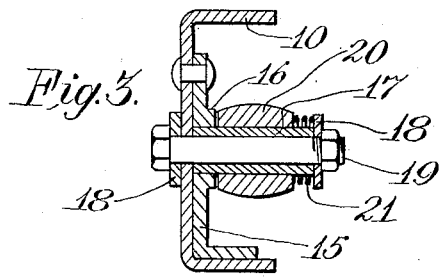
Inventor
Edward A. Johnston
By A. P. Deviate
Atty Patented June 23, 1931

1,811,052

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

UNIT POWER PLANT SUPPORT FOR MOTOR VEHICLES

Application filed November 24, 1928. Serial No. 321,615.

This invention relates to means for mounting a motor and transmission as a unit in the frame of a motor vehicle.

The object of the invention is to provide a mounting which is connected to the side frame members and to the motor and transmission in such a manner as to permit the necessary flexibility for the motor and the transmission unit with respect to the frame members when twisting strains take place in the frame of the motor truck.

Another object is to provide a simple support structure for mounting a motor in the frame of a motor vehicle and especially for connecting the transmission to the motor and for carrying the same in the frame of a vehicle.

Briefly, these desirable objects are accomplished by providing the motor block with support ledges that are adapted to be made fast to the forward ends of arms rockingly and flexibly connected at opposite points in the frame, said arms extending rearwardly of their pivotal mountings and being curved inwardly to be made fast to supporting ears formed on the transmission housing. The front end of the motor block is mounted in a cross sill member. Thus, the transmission housing may be mounted in the frame independently of the bell housing at the rear end of the motor to make for an improved unit type power assembly for the motor truck.

In the accompanying sheet of drawings illustrating a practical form of the invention, Figure 1 is a top plan view of the front end of a motor truck frame with the power unit mounted thereon by the hanger structure of this invention;

Figure 2 is a side elevational view of the same structure with the nearest side frame member of the motor truck removed for the sake of clearness; and, Figure 3 is a cross sectional view as seen along the line 3—3 looking in the direction of the arrows shown in Figure 1.

The motor vehicle comprises the usual channel side frame members 10 connected at their forward ends by a cross sill 11. An engine or motor block is shown at 12 and a transmission housing is shown at 13.

It is desired to mount the motor 12 and the transmission 13 as a unit assembly in the frame in such a manner that the transmission may be mounted in place independently of the bell housing 14 at the rear of the motor, such mounting providing the necessary flexibility for the unified motor and transmission assembly with respect to the side frame member when twisting strains take place in the frame of the motor truck.

Accordingly, each side frame member 10 has securely riveted thereto a bracket 15 which is formed with a small hub part 16 in which is carried a bearing 17 made fast between washers 18, by means of bolts 19. The bearings 17 in each side frame member 10 pivotally or rockingly carry arms 20, which arms are normally held in place yieldingly against the inner face of the hub 16 on the brackets 15 by means of coil springs 21. Each arm 20 extends forwardly and curves inwardly to pass under ledges 22 formed at opposite sides at the rear end of the motor block. The ledges 22 are accordingly bolted at 23 to the front end of each of these arms 20. The back ends of the arms 20 extend rearwardly and curve inwardly where they are bolted by bolts 24 to ears 25 formed on opposite sides of the transmission housing 13. A gear shift lever is shown at 26. The forward end of the engine or motor 12 is carried centrally in the front cross sill 11 as shown, thus forming a three point frame mounting for the motor.

From this detailed description it must now be clear that a simple and improved mounting is provided by the arms 20 which connect the transmission 13 to the frames 10 and motor 12 independently of the bell housing at the rear end of the motor. The springs 21 permit the necessary flexibility of the transmission and motor unit relative to the frame when twisting strains take place. Obviously, it is a simple matter to remove the transmission unit 13, without disturbing the engine mounting, and to replace the same.

Thus, is provided a simple suspension for a unit type power plant for a motor truck which achieves the desired objects heretofore recited. It is intended to cover all such changes and modifications which do not materially depart from this invention as indicated in the following claims.

What is claimed is:

1. The combination with a motor vehicle having a pair of side frame members, a motor, a transmission, of means for connecting the transmission to the motor and mounting the two as a unit on the frame members, said means comprising a bearing on each of the frame members, an arm pivotally mounted intermediate its ends on each bearing, means connecting the front ends of the arms to the motor, and means connecting the rear ends of the arms to the transmission.

2. The combination with a motor vehicle having a pair of side frame members, a motor, a transmission, of means for mounting the motor and transmission as a unit on the frame members, said means comprising a bearing carried on each of the side frame members, an arm pivoted intermediate of its ends on each bearing, means connecting the forward ends of said arms to the motor, means connecting the rear ends of said arms to the transmission, and resilient means on the bearings to permit the arms to shift yieldingly endwise on the bearings when twisting strains take place in the frame members.

3. The combination with a motor vehicle having side frame members, a motor, a transmission, of means for mounting the motor and transmission as a unit power plant on the frame members, said means including brackets carried at opposite points on the side frames, aligned bearings in the brackets, means for securing the bearings on the brackets and to the side frames, arms pivoted intermediate of their ends on the bearings, ledges at the rear end of the motor on opposite sides thereof, means securing the front ends of the arms to the said ledges, ears on opposite sides of the transmission, the rear ends of said arms curved inwardly to engage with the ears on the transmission, and means for securing the rear ends of said arms to the ears on said transmission.

4. The combination with a motor vehicle having side frame members, a motor, a transmission, of means for mounting said motor and said transmission as a unit assembly on the side frame members, said means including arms pivotally connected intermediate of their ends to the side frame members and having their opposite ends respectively connected with the motor and the transmission, and means for permitting said arms yieldingly to shift endwise of their pivots when the frame members are subjected to twisting strains.

5. The combination with a motor vehicle having side frame members, a motor, a transmission, of means for mounting said motor and transmission as a unit assembly on the frame members, said means comprising curved arms rockingly mounted at opposite points on the frames, means connecting the respective front ends of said arms to the motor, means connecting the respective rear ends of said arms to the transmission, and resilient means for permitting said arms to shift endwise of their fulcrums when twisting strains take place in the frame members.

6. The combination with a motor vehicle having a frame, a motor, and a transmission, of rockingly and shiftably mounted arms pivoted between their ends on the frame and having free ends connecting the motor and transmission as a rigid unit.

7. The combination with a motor vehicle having a frame, a motor, and a transmission, of a rigid connecter between the motor and transmission, and means pivotally mounting the connecter on the frame, intermediately of its ends.

8. The combination with a motor vehicle having a frame, a motor, and a transmission, of a connecter on each side of the motor and transmission rigidly to connect said motor and transmission, and means for rockingly and shiftably connecting the connecters intermediately of their ends to the frame.

In testimony whereof I affix my signature.

EDWARD A. JOHNSTON.